(12) United States Patent
Sofer

(10) Patent No.: US 11,297,105 B2
(45) Date of Patent: Apr. 5, 2022

(54) DYNAMICALLY DETERMINING A TRUST LEVEL OF AN END-TO-END LINK

(71) Applicant: International Business Machines Corporation, Armonk, NY (US)

(72) Inventor: Oded Sofer, Midreshet Ben Gurion (IL)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/935,278

(22) Filed: Jul. 22, 2020

(65) Prior Publication Data

US 2022/0030030 A1    Jan. 27, 2022

(51) Int. Cl.
*H04L 29/06* (2006.01)

(52) U.S. Cl.
CPC ........ *H04L 63/166* (2013.01); *H04L 63/1416* (2013.01); *H04L 63/1433* (2013.01); *H04L 63/20* (2013.01)

(58) Field of Classification Search
CPC ............... H04L 63/166; H04L 63/1416; H04L 63/1433; H04L 63/20
USPC .......................................................... 726/26
See application file for complete search history.

(56) References Cited

U.S. PATENT DOCUMENTS

| | | | |
|---|---|---|---|
| 7,949,683 B2 * | 5/2011 | Goyal ............... | G06F 16/90344 707/798 |
| 8,180,803 B2 * | 5/2012 | Goyal ............... | G06F 16/90344 707/798 |
| 8,473,523 B2 * | 6/2013 | Goyal ............... | G06F 16/90344 707/798 |
| 8,881,276 B2 | 11/2014 | Kratzer et al. | |
| 2001/0013062 A1 | 8/2001 | Ono | |

(Continued)

FOREIGN PATENT DOCUMENTS

| | | |
|---|---|---|
| CN | 109245993 A | 1/2019 |
| CN | 110288477 A | 9/2019 |
| WO | WO 2010074093 A1 | 7/2010 |

OTHER PUBLICATIONS

Xin Hu, Z. Morley Mao; Accurate Real-time Identification of IP Prefix Hijacking; 2007 IEEE Symposium on Security and Privacy (SP '07), Published May 23, 2007 https://ieeexplore.ieee.org/document/4223210.

(Continued)

*Primary Examiner* — Teshome Hailu
(74) *Attorney, Agent, or Firm* — Pearl Cohen Zedek Latzer Baratz LLP

(57) ABSTRACT

A system and method for dynamically determining a trust level of an end-to-end link of a computer database, including: in a preparation stage: capturing a first set of messages of an end-to-end link; compressing a skeleton of each message of the first set of messages to generate a construct of each message of the first set of messages, the skeleton includes the message without a value field; creating a characteristic histogram of the constructs of the first set of messages; and during an operation stage: capturing a second set of messages of the end-to-end link; compressing a skeleton of each message of the second set of messages to generate a construct of each of the second set of messages; creating a work histogram of the constructs of the second set of messages; and determining a trust level of the end-to-end link by comparing the work histogram with the characteristic histogram.

18 Claims, 10 Drawing Sheets

(56) References Cited

U.S. PATENT DOCUMENTS

| | | |
|---|---|---|
| 2003/0172291 A1 | 9/2003 | Judge et al. |
| 2009/0138497 A1* | 5/2009 | Zavoli .................... G01C 21/32 |
| 2011/0238985 A1* | 9/2011 | Sovio ............... H04N 21/25816 |
| | | 713/168 |
| 2013/0262518 A1* | 10/2013 | Goyal ............... G06F 16/90344 |
| | | 707/798 |
| 2018/0007058 A1 | 1/2018 | Zou et al. |

OTHER PUBLICATIONS

John Haldeman; Worrying About Your White List: Defining Trust in Database Sessions https://securityintelligence.com/worrying-about-your-white-list-defining-trust-in-database-sessions/ Security Intelligence; Published Jul. 11, 2016.

Configuring a sensor to ignore or whitelist traffic from certain IP addresses https://www.ibm.com/support/pages/configuring-sensor-ignore-or-whitelisttraffic-certain-ip-addresses, ; IBM Support Mar. 13, 2019.

Peter Mell and Timothy Grange; The NIST Definition of Cloud Computing, Special Publication 800-145, Sep. 2011.

International Search Report and Written Opinion of Application No. PCT/IB2021/056128 dated Oct. 18, 2021.

* cited by examiner

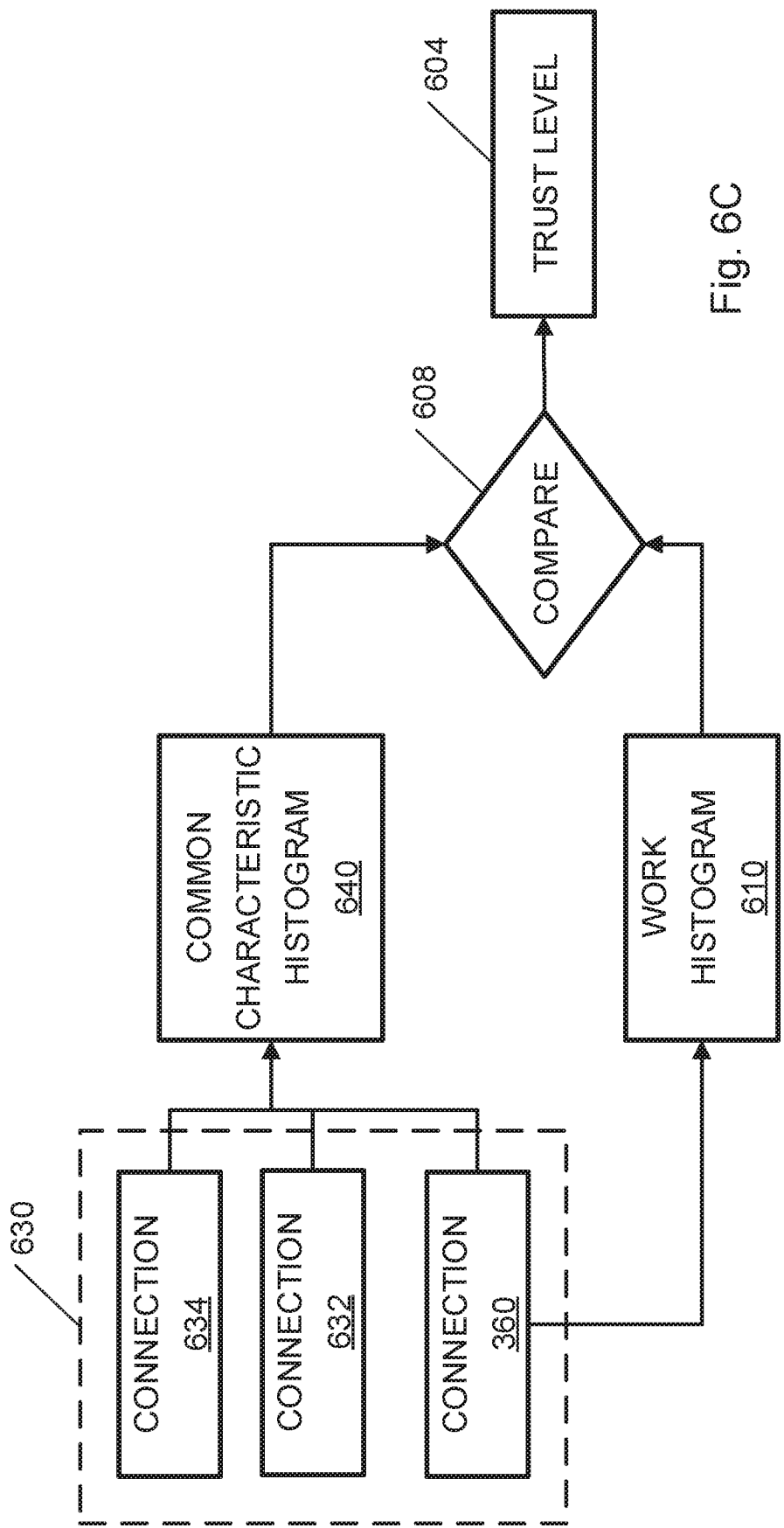

DYNAMICALLY DETERMINING A TRUST LEVEL OF AN END-TO-END LINK

FIELD OF THE INVENTION

The present invention relates generally to dynamic whiten sting, and specifically, to dynamically determining a trust level of an end-to-end link from a user to a computer database.

BACKGROUND

A data firewall typically captures or sniffs data accesses to a database (e.g., requests and responses) in real-time and analyzes the data according to policy rules. The data firewall may include a data activity monitor (DAM) and/or file activity monitor (FAM). The requests and responses sniffed by the data firewall may include a request, e.g., a structured query language (SQL) statement, or a response, and associated header information. The header may include metadata such as machine information, network information, user information, client information, etc.

The canonical solution for DAM is to install an agent on the data-source server (e.g., the database server). The agent may capture, mirror or sniff requests and responses and send requests and responses to a security server. The security server may parse the data, perform policy-enforcement, and then audit, analyze, alert or block the requests and responses as required. One of the main challenges of DAMs, is the huge amount of data that have to be captured and analyzed. For example, in a typical enterprise environment, a DAM may capture or sniff about 100 million transactions (e.g., requests and responses) per second (TPS). Sniffing and analyzing such huge amounts of data in real-time or near real-time requires appropriate computer infrastructure that may be very expensive.

Therefore, a method for reducing the amount of analyzed data is required.

SUMMARY

According to embodiments of the invention, a system and method for dynamically determining a trust level of an end-to-end link of a computer database may include: in a preparation stage: capturing a first set of messages of a first end-to-end link; compressing a skeleton of each message of the first set of messages to generate a construct of each message of the first set of messages, wherein the skeleton comprises the message without a value field; and creating a characteristic histogram of the constructs of the first set of messages; during an operation stage: capturing a second set of messages of the first end-to-end link; compressing a skeleton of each message of the second set of messages to generate a construct of each of the second set of messages; creating a work histogram of the constructs of the second set of messages; and determining a trust level of the first end-to-end link by comparing the work histogram with the characteristic histogram.

According to embodiments of the invention, an end-to-end link may be defined according to parameters of the end-to-end link, wherein the parameters are selected from: host name, service name, database name, client host name, operating system user and database user.

According to embodiments of the invention, determining the trust level of the end-to-end link may include determining the trust level of the end-to-end link to not trusted if at least one of the constructs of the second set of messages is not included in the characteristic histogram of the constructs of the first set of messages.

According to embodiments of the invention, compressing a skeleton may include hashing the skeleton to produce a hash.

Embodiments of the invention may include, in the preparation stage: adding the commands of the first set of messages divided into command groups to the characteristic histogram; during the operation stage: adding the commands of the second set of messages divided into the command groups to the work histogram.

Embodiments of the invention may include, in the preparation stage: obtaining a plurality of sets of messages, wherein each set pertains to an end-to-end link of a set of end-to-end links; generating a construct of each message of the plurality of sets of messages; creating a characteristic histogram for each end-to-end link of the set of end-to-end links, wherein each characteristic histogram is created from the constructs of a set of messages of an end-to-end link of the set of end-to-end links; and performing clustering of the characteristic histograms to determine clusters of end-to-end links; during operation: comparing the work histogram with each of the characteristic histograms of a cluster of the first end-to-end link to determine the trust level of the first end-to-end link.

According to embodiments of the invention, capturing a second set of messages may be repeated for every new session and periodically.

According to embodiments of the invention, the trust level may be selected from trusted and not trusted, and embodiments of the invention may include: not performing comprehensive security analysis for future messages of the end-to-end link if the trust level is trusted; and applying policy rules to future messages of the end-to-end link if the trust level is not trusted.

Embodiments of the invention may include, adding the construct of each of the second set of messages to the characteristic histogram if the trust level is trusted.

According to embodiments of the invention, the work histogram may be compared with the characteristic histogram by comparing the variance of the work histogram with the variance of the characteristic histogram.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 6C depicts comparison of a work histogram of an end-to-end link with a common characteristic histogram of a cluster of end-to-end links, according to embodiments of the invention;

Figure 1:
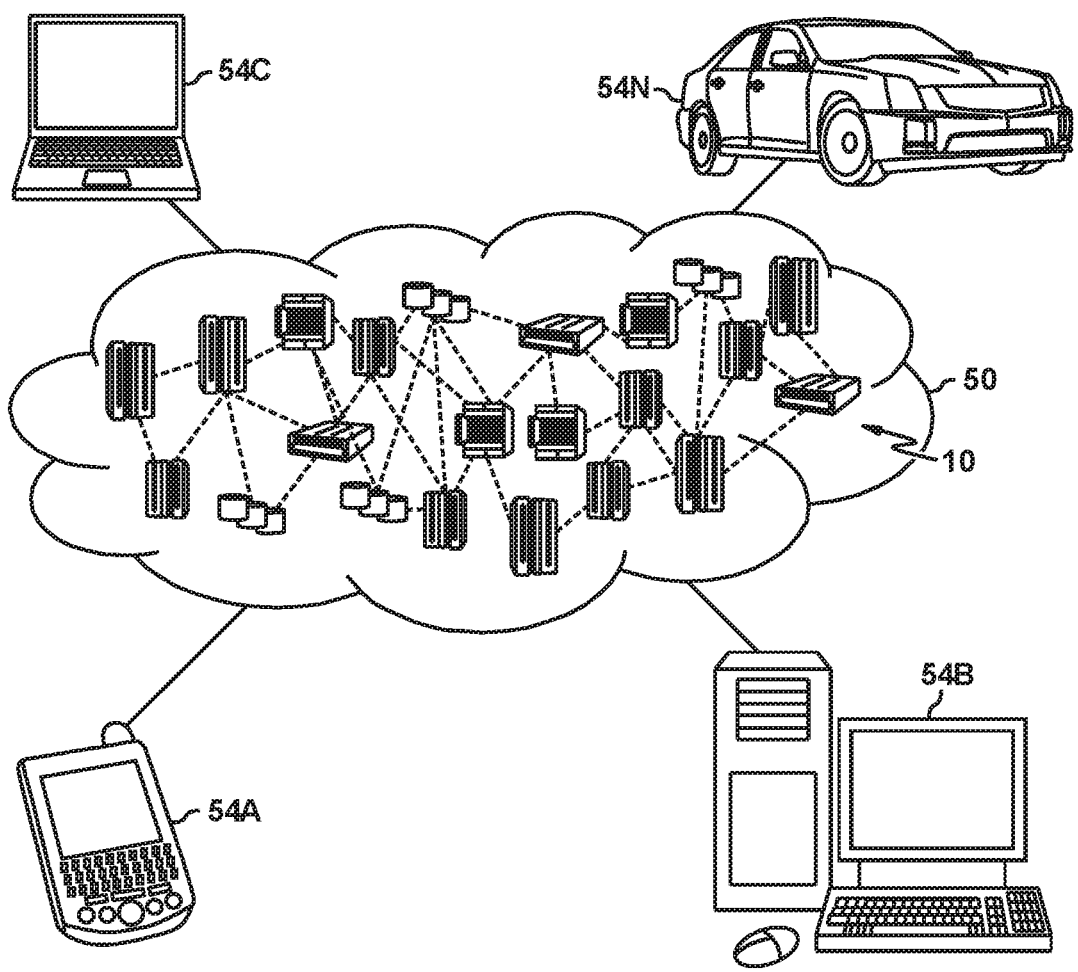
FIG. 1 depicts a cloud computing environment according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining", "establishing", "analyzing", "checking" or the like, may refer to operation, and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Example cloud model may include for example five characteristics, at least three service models, and at least four deployment models.

Characteristics may be for example:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be for example:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database-as-a-Service (DBaaS): the capability provided to the consumer is to store data on a cloud infrastructure. DBaaS paradigm is a common approach for storing data in a cloud based computerized service, where users get access to data without the need for managing hardware or software.

Deployment Models may be for example:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are hound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Embodiments of the invention may provide a system and method for dynamic whitelisting or for dynamically determining a trust level of a connection of a computer database. According to embodiments of the invention, messages (e.g., the body or payload of database requests and responses) associated with a trusted end-to-end links may not undergo comprehensive security analysis.

Current architecture of DAM and FAM products is based on a two steps process. The first step is performed in real-time by an agent software or application which is installed on the data source machine and the second step is performed offline by a security server application, also referred to as a collector. The data source machine may include a database, e.g., a database server, a file server, etc., or a combination of a database and a proxy or network gate of the database. The agent software may be installed on the database itself or on the proxy or network gate of the database. Installing the agent software on a proxy or network gate of a database may enable capturing data packets also referred to as data records in cloud-based databases (when DBaaS model is used) that are many times operated by a third party that does not allow installation of software applications on its databases.

According to prior art applications, the agent application may capture or receive all the data packets including requests and responses of the monitored database, read the header information, perform an initial rile processing on the header information, and then send the data packet to the collector application for an offline comprehensive security analysis. The comprehensive security analysis performed by the collector may include getting or receiving the data packet from the agent, parsing the data packet, structuring the data, e.g., classifying the data and mapping the metadata to the data, building the data hierarchy, applying the policy rules on the classified data to identify sensitive data and detecting a data breach or data tampering, according to the rules matching. Thereafter, the collector may send the data for further analysis and auditing by other components.

Many of the processes of the comprehensive security analysis performed by the collector rely on the mapping and classification of the data, which is typically running offline, due to the complexity and performance requirements of the mapping and classification of huge amounts of data (e.g., +100,000 TPS per data source or a total of 100 million TPS). The agent must not delay the transaction and must avoid latency. Sniffing and analyzing such huge amounts of data in real-time or near real-time requires appropriate computer infrastructure that may be very expensive.

One approach for decreasing the amount of analyzed data is whitelisting. Whitelisting may include determining a trust level or other rating for an end-to-end link not performing a comprehensive security analysis for requests and responses of trusted end-to-end links, and performing a comprehensive security analysis for requests and responses of not-trusted end-to-end links.

Existing solutions for whitelisting may include using techniques like user behavior analytics application (UBA), risk-assessment, signature-searching and trusted-connection to tag or label the end-to-end link as trusted or not. However, all these techniques are static, e.g., once a connection is classified as trusted, the entire volume of communication in this connection is considered as trusted. Thus, those techniques are exposed to attacks such as hijacking, in which an attacker takes over a portion of a connection and acts as one of the participants.

Embodiments of the invention may improve the technology of security analysis by providing a method for whitelisting, or determining a trust level or rating of an end-to-end link, that is both dynamic (e.g., performed periodically in run time) and at the same time requires low computational resources (comparing to full analysis of the communication). Embodiments of the method for determining a trust level of an end-to-end link may be performed periodically, in real-time or near real-time, and thus may enable detecting abnormal behavior of communications over end-to-end links that were previously determined as trusted. Therefore, assuming that a hijacker may behave differently than a normal user of an end-to-end link, hijacking attacks, in which an attacker takes over a portion of an end-to-end link that was previously categorized as trusted, may be detected.

A database connection may be a software structure that may enable a client application or software to communicate with a data source machine, e.g., send commands and receive replies. In many applications, connections are pooled to facilitate connection reuse. Thus, a plurality of users may use a plurality of connections in collaboration. According to embodiments of the invention, an end-to-end link may represent communication between a single client and a single database. The link may be carried over multiple connections in one or more connection pools.

According to embodiments of the invention, an end-to-end link may be defined by a tuple or a combination of parameters related to a request sent to the database or a response from the database, that specifies the end-to-end link. The tuple may include parameters relating request or response to a single user. Those parameters may be taken from the header of the request or response. Ideally, and end-to end link may be unique to a single user, or at least as close as possible to a single user based on the available parameters. the tuple of parameters may include user information, source program information and database information. The user information may include parameters identifying the user itself. For example, the user information parameters may include one or more of the database user identification (DB User), operating system user identification (OS User), application user identification (App User) and the client host address (ClientHost). The source program information may include parameters identifying the application or software used to connect the user to the database, e.g., SQLplus, Java database connectivity (JDBC) etc. The database information may include parameters identifying the database. For example, database information may include one of a name of the database (DbName) or service name (ServiceName), and one of the database server host name (ServerHostName) or the database server IP. Other user information parameters, source program information parameters, database information parameters or other parameters may be used.

Using a tuple and not just the database user identification (DB User) to specify an end-to-end link may enable defining a single end-to-end link that is used by a single user, e.g., a single user may be detected in situations where multiple users share the same connection or connection pool. A situation in which multiple users use or share the same connection or connection pool is very common in many applications, for example, multiple bank tellers may access the same database using a single connection.

According to embodiments of the invention, a signature of an end-to-end link may be generated. The signature may be generated based on messages pertaining to the end-to-end link that may represent the normal behavior of the end-to-end link. In some embodiments, the signature may include or may be generated from a compressed or reduced size version of the messages without the value field and/or from commands used in the end-to end link. According to some embodiments of the invention, the end-to-end links may be divided to groups or clusters of similar end-to-end links, for example, by a classifier or by performing clustering analysis on the signatures. Each cluster may include a group of end-to-end links with small distance between signatures of the end-to-end links in the cluster. Once a signature is created, the communication pertaining to the end-to-end link may be checked periodically by comparing the communication over the end-to-end link to the signature, or to the cluster of signatures. A trust level of the end-to-end link may be determined based on the comparison.

In some embodiments, the signature may be generated by creating a construct of each message (without the value filed) of a set of messages of an end-to-end link, and creating a characteristic histogram from the constructs, where the signature may be or may include the characteristic histogram. For example, the construct may include a hash or other compressed version of the message without the value field of the message. Removing the value field of the message before compressing the message may increase the uniformity of the compressed values. The operation used for generating the construct in some embodiments may reduce the number of bits, be very fast to compute and minimize collisions (a collision may occur when the same construct is generated for different messages). To generate the characteristic histogram from the constructs, the constructs may be divided into bins. It is assumed that during normal operation of an end-to-end link, the vast majority of the messages (without the value field) are similar, therefore hashing the messages without the value field may generate a typical characteristic histogram.

In some embodiments, the characteristic histogram may also include commands of the set of messages of the end-to-end link. For example, the characteristic histogram may be generated by grouping the commands to bins of commands groups. For example, the command groups may include data definition language commands (DDL), data manipulation language commands (DML), data query language commands (DQI), data control language commands (DCL), transaction control language commands (TCL), etc. It is assumed that during normal operation of an end-to-end link, the vast majority of the commands will repeat themselves, therefore counting the number of commands in each command group may generate a typical commands histogram the may be included in the characteristic histogram. Thus, according to some embodiments, the signature of an end-to-end link may include a characteristic histogram including construct and/or command bins.

In many database applications, the same operations are repeating, by the same user and by other users of the same role. For example, all the users who are retail bankers may repeat the same operations many times during the day. For example, they may perform business transactions like money movement, loan approvals, checking accounts to many clients, etc., where each business transaction may be performed by hundreds of SQL statements. Thus, according to embodiments of the invention, removing the values from the messages may detect the repeating and common activities. Therefore, as long as the same user is using the end-to-end link for the same purposes, the general shape of the characteristic histogram may remain the same. In contrast, large deviations in the general shape of the characteristic histogram may serve as an indication of a possible security problem.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. Cloud computing environment is typically located remotely from its users. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
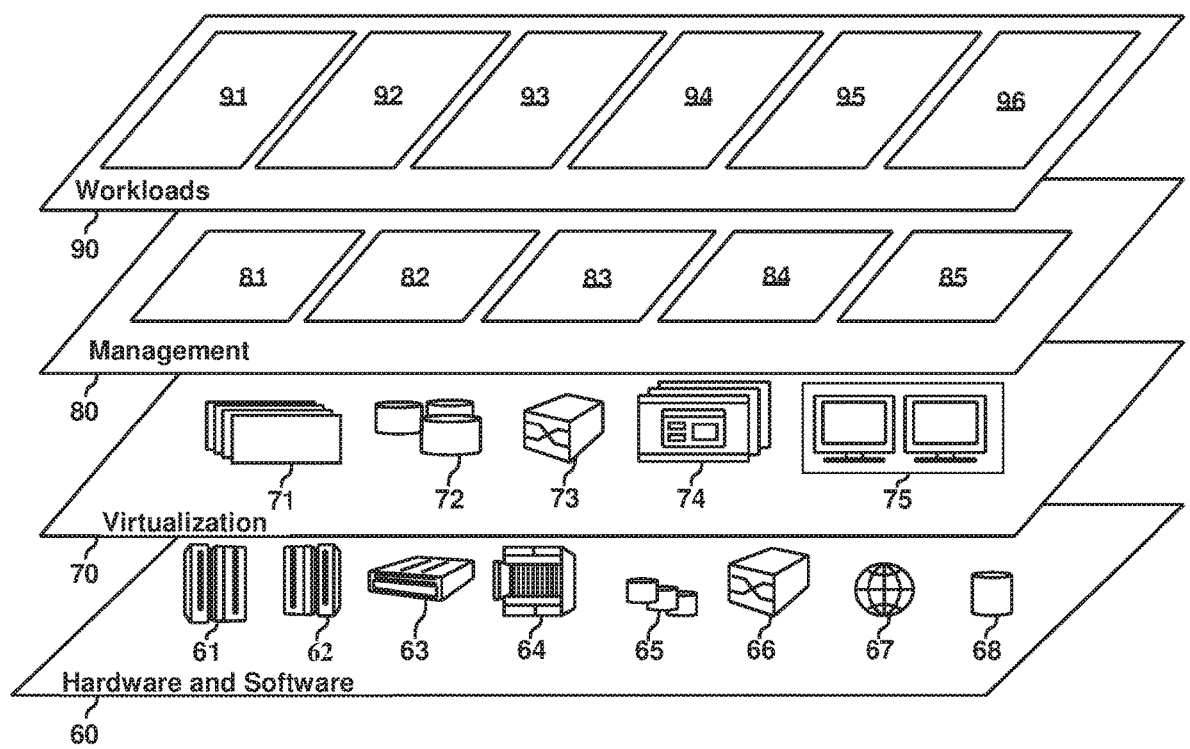
FIG. 2 depicts abstraction model layers according to an embodiment of the present invention.
Figure 10:
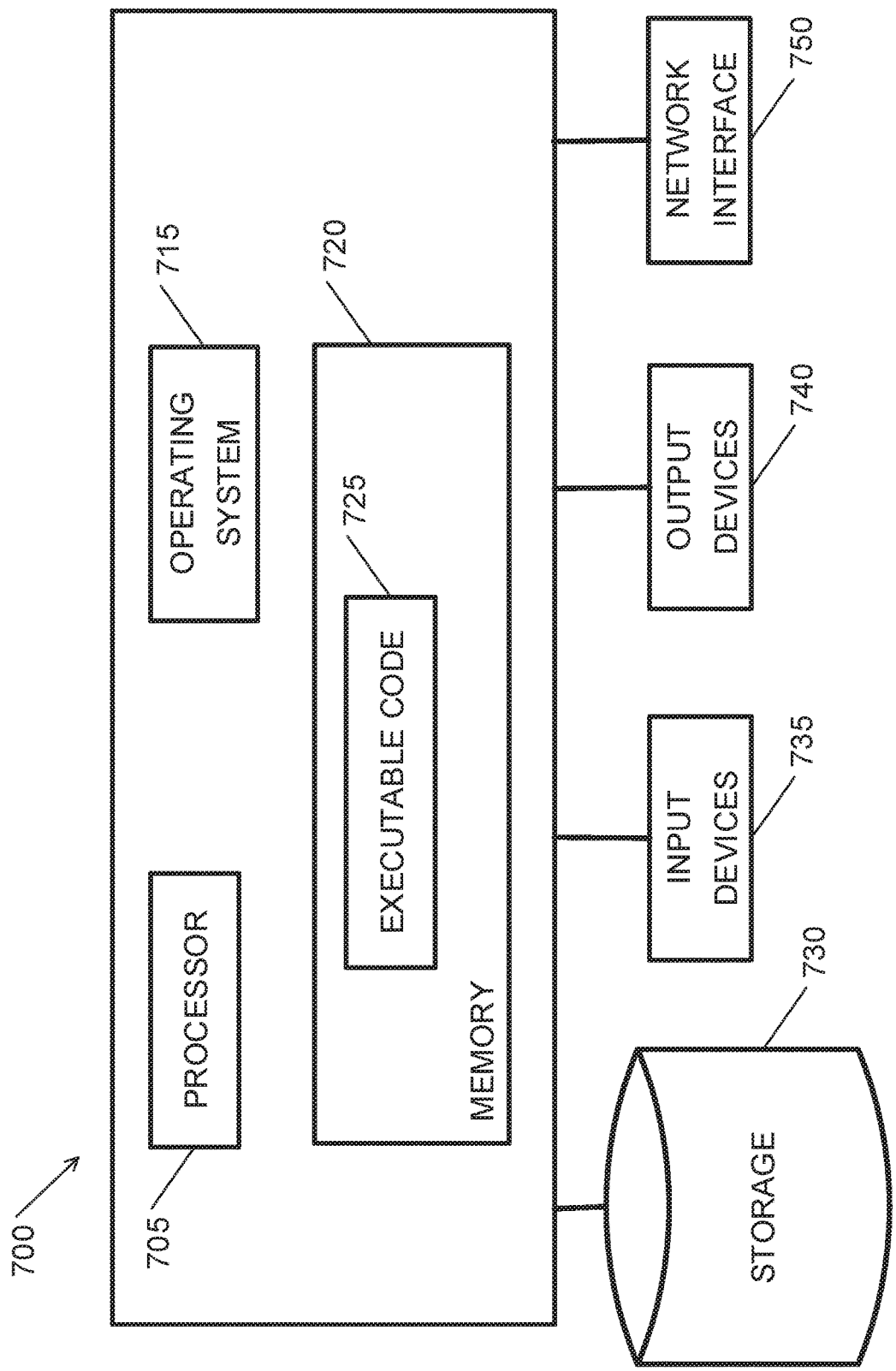
FIG. 10 illustrates an example computing device according to an embodiment of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components, such as the hardware and software components depicted in FIG. 10. Examples of hardware components include: processors (e.g., processor 705 depicted in FIG. 10) such as mainframes 61, RISC (Reduced Instruction Set Computer) architecture based servers 62, servers 63 and blade servers 64; storage devices 65 (e.g., storage device 730 depicted in FIG. 10); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

According to some embodiments, a monitored database may be implemented on virtual storage 72 and physically located on storage devices 65. The database may be managed by database software 68 that may include an agent software according to embodiments of the invention. A collector or a data security application may be implemented by software running on a virtual server 71. However, other architecture and hardware may be used.

In one example, management layer 80 may provide the example functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
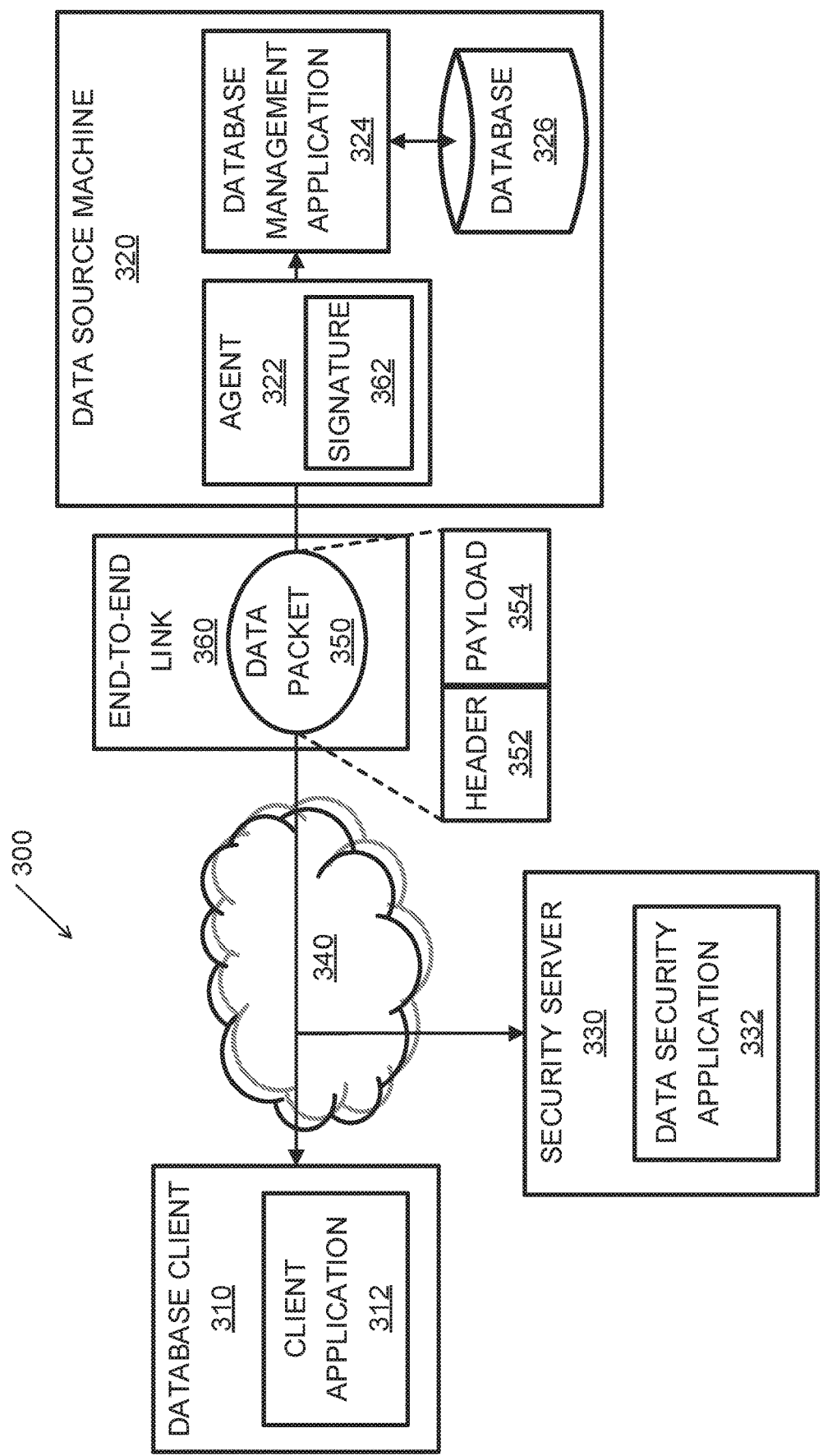
FIG. 3 depicts a system, according to embodiments of the invention.

Reference is made to FIG. 3, depicting a system 300, according to embodiments of the invention. According to some embodiments, security server 330 may be implemented on a virtual server 71 and data source machine 320 may be implemented on virtual storage 72, however, other implementations may apply. It should be understood in advance that the components and functions shown in FIG. 3 are intended to be illustrative only and embodiments of the invention are not limited thereto.

Networks 340 may include any type of network or combination of networks available for supporting communication between database client 310 data source machine 320 and security server 330. Networks 340 may include for example, a wired, wireless, fiber optic, or any other type of connection, a local area network (LAN), a wide area network (WAN), the Internet and intranet networks, etc. Additionally or alternatively, any of database client 310 data source machine 320 and security server 330 may be connected to each other directly.

According to some embodiments, a database client application 312 running on database client 310 may communicate with data source machine 320, for example, by generating and submitting data packets or data records 350 including for example database queries to data source machine 320. Data packets may pertain to end-to-end link 360.

In one example, a query transmitted from database client 310 to data source machine 320, may be or may be included in one or more database protocol packets, also referred to as data packets 350 that includes a header 352 and a payload 354. Header 352 may include metadata such as machine information, network information, user information, client information, etc. For example, the header may include the following parameters used to define end-to-end link 360, ServerHostName, ServiceName, DbName, ClientHost, OsUser, DbUser, etc. Payload 354 may include data and/or statements for a database query, e.g., SQL requests or responses. While a single database client 310 and a single data source machine 320 are shown in FIG. 3, one or more data source machines 320 may provide database services to one or more database clients 310 or client applications 312.

Figure 5:
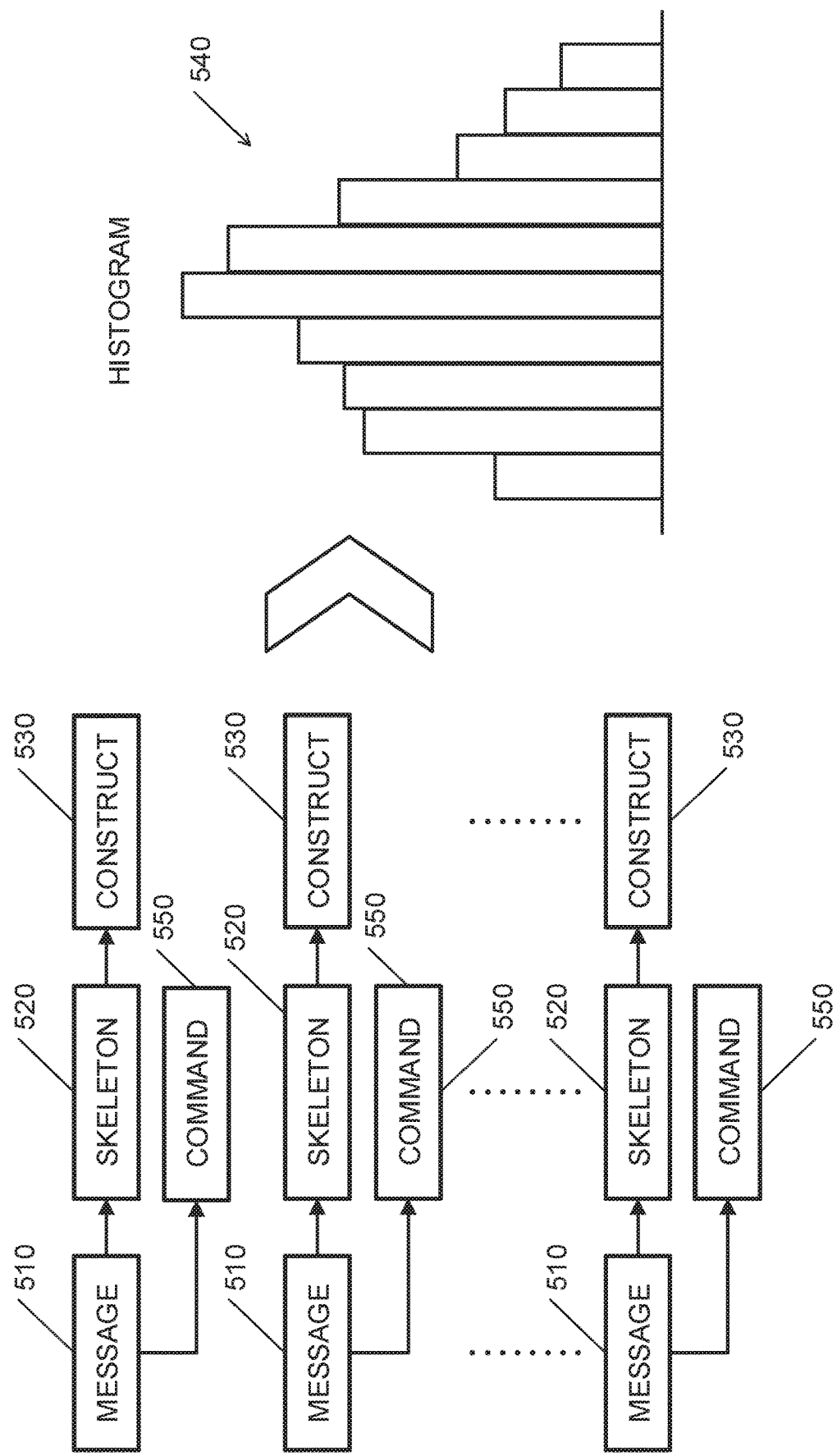
FIG. 5 depicts messages, skeletons, constructs and a characteristic histogram of an end-to-end link, according to embodiments of the invention.

In one example, payload 354 of data packet 350 may include a query (e.g., a request or an SQL statement) or a response to a query, referred to uniformly herein as a message 510 (depicted in FIG. 5). A query may include a structured query language (SQL) statement, for accessing data in tables managed by the database management application (e.g., database management application 324, and/or database software 68). SQL represents a standardized language for defining and manipulating data in a relational database. For example, under a relational database model, the database may be perceived as a set of tables that include data, and data may be retrieved by using SQL statements to specify a result table that can be derived from one or more tables. The query may be defined in one or more additional or alternate languages or protocols for defining and manipulating data in a relational database or in other types of databases.

Figure 4B:
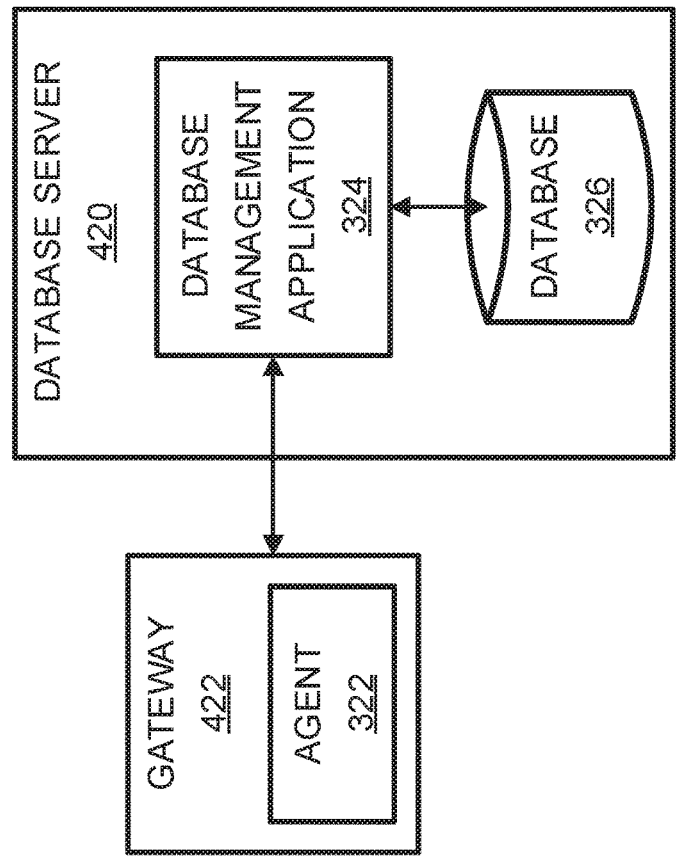
FIG. 4B depicts a data source machine that includes a combination of a gateway, a network gate or a proxy and a database server, according to embodiments of the invention.
Figure 4A:
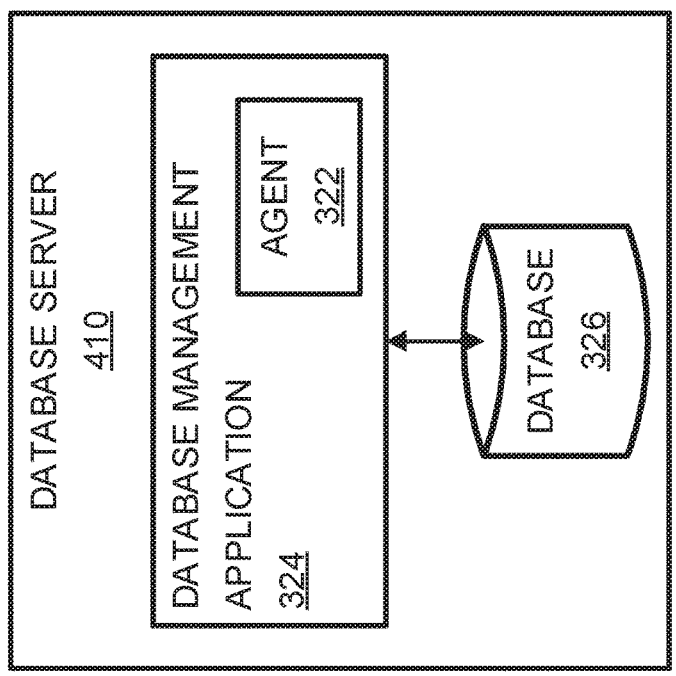
FIG. 4A depicts an example of a data source machine that includes a database server, according to embodiments of the invention.

Data source machine 320 may include a database 326, e.g., a database server, a file server, etc., or a combination of a database 326 and a proxy or network gate of the database 326, a database management application 324, and an agent application 322. An example of a data source machine that includes a database server 410 is depicted in FIG. 4A. Database server 410 may include database 326 managed by database management application 324, that may include or may communicate with an agent application 322. Similar architecture may apply to a file server. FIG. 4B depicts a data source machine that includes a combination of a gateway, a network gate or a proxy 422 and a database server (or file server) 420. Database server 420 may include a database 326 managed by database management application 324. In this embodiment, an agent application 322 is located at gateway, network gate or proxy 422.

In one example, in response to a query from database client 310, database management application 324 may handle the query and generate a response for the query that is returned to database client 310 in a database server response.

Data packet 350 may be streamed between database client 310 and data source machine 320 on end-to-end link 360. Agent 322 may be a computer-executed process that may capture, sniff or intercept one or more data packets 350 along the communication stream between database client 310 and data source machine 320, without interfering with the communication of data packets 350 to data source machine 320. Agent 322 may be implemented at one or more points along the communication stream between database client application 312 and data source machine 320 to monitor for and capture or intercept data packets 350 without requiring the participation of the database management application 432 (or database software 68), and without relying on any form of native auditing or native logs of the database management application 324. While drawn as part of data source machine 320, agent 322 may intercept data packets 350 at other locations such as, but not limited to, the database memory of database server 410 and 420, within network 340, at the operating system level, or at the level of database libraries.

End-to-end link 360 may be defined by a tuple or a combination of parameters related to data packets 350 (typically found in header 352). The tuple may include one or more of user information parameters such as OsUser, DbUser, App User, ClientHost (e.g., related to database client 310), etc., source program information, and database information such as ServiceName or DbName and ServerHostName or database server IP (e.g., related to database 326). Using a tuple and not just the username (DB User) to specify end-to-end link 360 may be needed to identify end-to-end links 360 within connections or connection pools, e.g., a situation in which multiple users use or share a single connection or a connection pool.

According to embodiments of the invention, agent 322 may capture or intercept a plurality of data packets 350 flowing between data source machine 320 and data client 310. Agent 322 may capture both data packets 350 including query packets transmitted from data source machine 320 to data client 310 and data packets 350 including response packets transmitted from data client 310 to data source machine 320. Data packets 350 may be captured in real-time substantially without adding latency or delay.

According to some embodiments, agent 322 may decrypt captured data packets 350 to obtain header 352 of each data packets 350. Agent 322 may analyze headers 352 to obtain the header information and to associate the packet with an end-to-end link 360 based on the header information. According to some embodiments of the invention, end-to-end link 360 may be associated with a trust level, a security status or a security grade or rating. According to embodiments of the invention, agent 322 may associate each data packet 350 with the security status or trust level of end-to-end link 360 to which it pertains. The trust level may be a categorial parameter, that may for example be either "trusted" or "not trusted". Other trust levels or ratings may be used.

In some embodiments, agent 322 may apply policy rules to future messages of a not trusted end-to-end link 360. According to embodiments of the invention, agent 322 may determine whether a data packet 350 needs to be sent to security server 330 based on or according to the trust level. A trusted end-to-end link 360 may be placed in a whitelist, and messages 510 associated with a trusted end-to-end link 360 may be ignored, e.g., excluded from further security analysis, and specifically from the comprehensive security analysis performed by security server 330. Thus, agent 322 may not send messages 510 associated with a trusted end-to-end link 360 to security server 330. On the other hand, if end-to-end link 360 is categorized as not trusted, messages 510 associated with end-to-end link 360 (that is not trusted) may be sent by agent 322 to security server 330 to undergo a comprehensive security analysis. In some embodiments, agent 322 may issue an alert if end-to-end link 360 is categorized as not trusted. Other security measures may be taken in case end-to-end link 360 is categorized as not trusted according to embodiments of the invention. It should be readily understood that a single end-to-end link 360 may be categorized as trusted at sometimes, and as not trusted at other times, as disclosed herein.

Thus, when capturing a data packet 350, agent 322 may decrypt the header 352 to obtain header information, also referred to as metadata, including, for example, machine information, network information, user information, client information, etc. agent 322 may determine the end-to-end link 360 associated with the data packet 350 based on the header information. Once the end-to-end link 360 is known, agent 322 may verify the security status associated with the end-to-end link 360 and act accordingly. Agent 322 may determine based on the security status whether message 510 associated with header 352 should be blocked, should be allowed to flow without further analysis or whether further security analysis is required. For example, a header security rule may define that messages 510 from a certain end-to-end link 360 should be blocked if a user is known as a malicious entity, should be allowed to flow without further analysis (e.g., ignored) if end-to-end link 360 is trusted, or should be further analyzed if the status of end-to-end link 360 is not trusted. Other header security rules or a combination of header security rules may be used. Since the header structure is known, decrypting and analyzing header 352 may be performed in real-time without introducing significant delay.

According to embodiments of the invention, agent 322 may generate a signature 362 to end-to-end link 360. Agent 322 may generate signature 362 based on messages 510 sent over end-to-end link 360 and captured by agent 322, e.g., in a preparation stage and during operation stage as disclosed herein. Thus, signature 362 may represent the normal behavior of end-to-end link 360. To generate signature 362, agent 322 may capture messages 510 over a time window of a preparation stage (also referred to as a training stage) or until a sufficient number of messages 510 are captured. For example, in a typical application, about 150,000-400,000 messages 510 may be required to generate signature 362. In some embodiments, the preparation stage may include a plurality of sessions (a session may refer to a logical representation of a connection to a database from login to logout). In some embodiments, agent 322 may capture messages 510 in a first one or two minute of 20-40 sessions to generate signature 362. Other time windows for capturing messages for generating signature 362 may be used. According to embodiments of the invention, agent 322 may generate signature 362 to end-to-end links 360 with high volume or high rate of messages 510. For example, agent 322 may not generate signatures to sessions with messages rate below a threshold, e.g., below 100 messages per second.

In some embodiments, all the messages 510 used for generating signature 362 may undergo comprehensive security analysis as disclosed herein, or otherwise inspected to verify that they represent normal behavior of end-to-end link 360.

Signature 362 may include a compressed or reduced size version of messages 510 without the value field captured during the preparation stage. Once signature 362 is created, agent 322 may periodically check the communication over end-to-end link 360 by comparing messages 510 of end-to-end link 360 to signature 362. Agent 322 may calculate or determine a trust level of end-to-end link 360 based on the comparison. According to some embodiments, the preparation stage and the generation of signature 362 may be repeated periodically, e.g., once a week or once a year.

According to some embodiments, signature 362 may include a characteristic histogram related to messages 510 sent over end-to-end link 360 during the preparation stage. The histogram generated during the preparation stage may be referred to herein as the characteristic histogram of end-to-end link 360. In this case, a comparison may be performed by sampling messages 510 over a time window during an operation stage, generating a work histogram and comparing the work histogram to the characteristic histogram as disclosed herein.

Reference is now made to FIG. 5, depicting messages 510, skeletons 520, constructs 530 and a histogram 540 of end-to-end link 360, according to embodiments of the invention. Histogram 540 may represent either the characteristic histogram or the work histogram. For example, for generating characteristic histograms (e.g., signature 362), agent 322 may capture messages 510 during a training or preparation stage and for generating work histograms agent 322 may capture messages 510 during run time or operation stage.

In some embodiments, agent 322 may generate histogram 540 by generating a skeleton 520 from each message 510 used for generating histogram 540, a construct 530 from each skeleton 520 and a histogram 540 from constructs 530. Histogram 540 may be (or may be a part of) signature 362 of end-to-end link 360 for messages captured during a preparation stage, and the work histogram for messages captured during run time or operation stage.

Agent 322 may generate skeleton 520 from message 510 by removing the values from message 510. The values be or may refer to specific data elements that are stored in the database tables. Thus, skeleton 520 may include message 510, without the value field. Examples for SQL statements are provided below:

Example 1: Select NAME from EMPLOYEE where DEPARTMENT="SALE" and BAND>8

Example 2: SELECT FULL_NAME, ADDRESS from CUSTOMER,
PHONE where PHONE.PHONE_NO like "01230123012%"
and
CUSTOMER.CUSTOMER_ID=PHONE.CUSTOMER_ID The values in example 1 are 'SALE' and '8', and in Example 2 the value is the phone number '01230123012'. These examples are for the requests. Responses typically include column heading and the values. Thus, to generate the skeleton 520 from the responses values may be removed and the skeleton 520 may include the column headings.

Agent 322 may generate construct 530 from skeleton 520 by hashing skeleton 520 or using other compression method. The operation used for generating construct 510 may reduce the number of bits of message 510, be very fast to compute and minimize collisions, e.g., in some cases should not or should rarely generate the same construct 350 for different skeleton 520. In typical applications, a length of a skeleton 520 may range from tens of characters up to thousands of characters for complex statements. A hash of the skeleton 520 may be up to about 15-25 characters.

For generating characteristic histogram 540, agent 322 may divide the values of constructs 530 to a series of intervals, typically, the intervals are consecutive, adjacent and non-overlapping, each interval may be referred to as a bin or a bucket. Agent 322 may then count how many constructs 530 fall within each bin. The bins may be of equal size or not. It is assumed that messages 510 of an end-to-end link 360 may repeat themselves or may be similar to each other, especially when the values are removed. Thus, generating a characteristic histogram 540 based on the skeleton 520 of the messages 510 may represent the common behavior of end-to-end link 360. Therefore, it may be expected that the distribution of messages 510 of an end-to-end link 360 would remain similar to the characteristic histogram.

According to some embodiments, histogram 540 may include the commands used in messages 510 additionally or alternatively to constructs 530. For example, agent 322 may divide commands 550 included in messages 510 into command groups. For example, the command groups may include DDL, DML, DQI, DCL, TCL, etc. Thus, each command group may be a bin in histogram 540 and agent 322 may place each command in the appropriate bin based on the type of the command.

According to embodiments of the invention, during an operation stage, and as long as end-to-end link 360 is labeled or categorized as trusted, agent 322 may not send messages 350 associated with end-to-end link 360 to security server 330 for a comprehensive security analysis. This may dramatically reduce the computational power required at security server 330. However, in order to detect hijacking attacks, agent 322 may sample messages 510 associated with end-to-end link 360 from time to time, e.g., periodically, for example, every 10-30 minutes and/or for every new session, and check for variations from the signature, e.g., the characteristic histogram. According to embodiments of the invention, agent 322 may sample messages 510 of end-to-end links 360 and check for variations from the signature 362 only in sessions with high volume or high rate of messages 510. For example, agent 322 may not check against a signature messages of sessions with messages rate below a threshold, e.g., below 100 messages per second. Instead, messages 510 of those sessions may undergo a comprehensive security analysis since they do not contain a large amount of data and therefore do not introduce high loads to the system.

For example, agent 322 may sample messages 510 associated with end-to-end link 360 during a sampling time window. The sampling time window may be of fixed length (e.g., 1-2 minutes) or may continue until a sufficient number of messages 510 are sampled (e.g., 100-400 messages). According to embodiments of the invention, agent 322 may generate a work histogram 540 from the sampled messages 350 as disclosed herein.

Figure 6A:
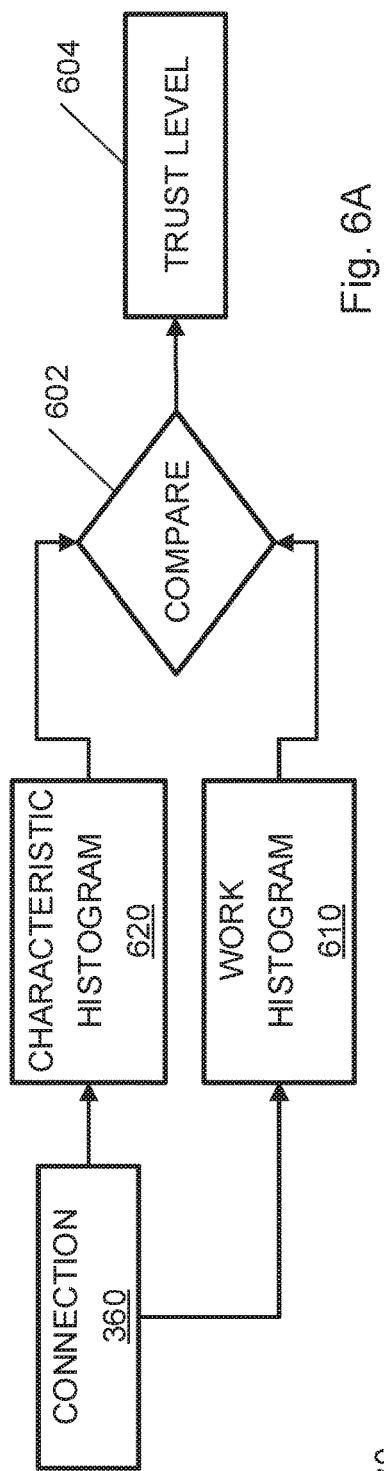
FIG. 6A depicts comparison of a k histogram of an end-to-end link with a characteristic histogram of the end-to-end link, according to embodiments of the invention.

Reference is now made to FIG. 6A, which depicts comparison of a work histogram 610 of an end-to-end link 360 with a characteristic histogram 620 of end-to-end link 360, according to embodiments of the invention. In FIG. 6A, characteristic histogram 620 is generated in a preparation stage and work histogram 610 is generated during an operation stage, as disclosed herein. According to embodiments of the invention, agent 322 may compare 602 work histogram 610 with characteristic histogram 620 to determine a trust level 604 of end-to-end link 360. In some embodiments, agent 322 may determine trust level 604 directly from the comparison 602, and in some embodiments, agent 322 may calculate a security grade based on the comparison 602 and may determine trust level 604 by comparing the security grade to a threshold. Comparison 602 may be performed using any applicable statistical or other method. For example, agent 322 may compare 602 the variance of the work histogram 610 with the variance of the characteristic histogram 620. For example, agent 322 may determine that end-to-end link 360 may remain trusted if for example the following is true and that end-to-end link 360 may be classified as not trusted if the following is not true (other rules may be used):

$$\text{work\_histogram\_variance} < 2*\text{characteristic\_histogram\_variance} \quad \text{(Equation 1)}$$

Figure 6B:
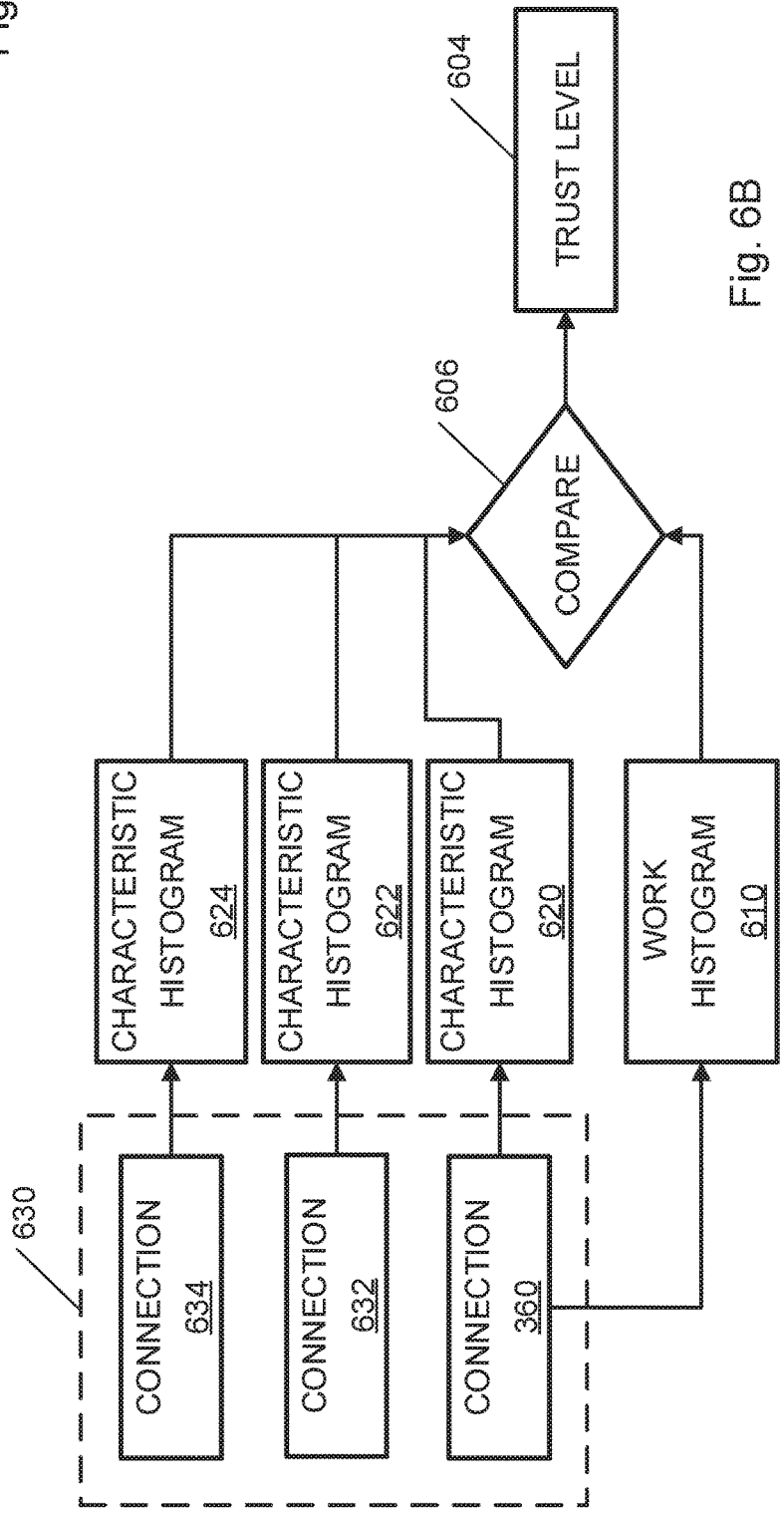
FIG. 6B depicts comparison of a work histogram of an end-to-end link with a plurality of characteristic histograms of a plurality of end-to-end links each pertaining to a cluster of end-to-end links, according to embodiments of the invention.

Reference is now made to FIG. 6B, which depicts comparison 606 of a work histogram 610 of end-to-end link 360 with a plurality of characteristic histograms 620, 622, 624 of a plurality of end-to-end links 360, 362, 364 each pertaining to a cluster 630 of end-to-end links 360, 362, 364, according to embodiments of the invention. While cluster 630 is depicted as including three end-to-end links 360, 362, 364, this is an example only and a cluster 630 may include any number of end-to-end links.

Agent 322 may find clusters 630 of end-to-end links 360, 362, 364, where the features used for the clustering may include, for example, constructs of end-to-end links 360, 362, 364 and/or commands used in end-to-end links 360, 362, 364. for example, the commands used in end-to-end links 360, 362, 364 may be grouped to command groups such as DDL, DML, DQI, DCL, TCL, etc. A clustering algorithm may be used to find clusters each including similar end-to-end links, for example those having common constructs and commands. In some embodiments, k-means clustering may be used to partition end-to-end links 360 into k clusters 630 in which each end-to-end link 360 belongs to the cluster 630 with the nearest mean. Other clustering methods may be used.

In some embodiments, agent 322 may compare 606 (e.g., using Equation 1) work histogram 610 with each of characteristic histograms 620, 622 and 624 of cluster 630 of end-to-end link 360 to determine the trust level 604 of end-to-end link 360. For example, Equation 1 in some embodiments should be true for all characteristic histograms 620, 622 and 624 for end-to-end link 360 to be considered trusted, and it may be enough that Equation 1 will not be true for one of characteristic histograms 620, 622 and 624 for end-to-end link 360 to be considered not trusted. Other rules and terms may be used to determine a trust level of end-to-end link 360.

Reference is now made to FIG. 6C, which depicts comparison 608 of a work histogram 610 of end-to-end link 360 with a common characteristic histogram 640 of a cluster 630 of end-to-end links 360, 362, 364, according to embodiments of the invention. In some embodiments, a common characteristic histogram 640 may be generated, common to all end-to-end links of cluster 630 and the work histogram 610 of end-to-end link 360 may be compared 608 (e.g., similarly to comparison 602) against the common characteristic histogram 540 to determine a trust level of end-to-end link 360.

According to embodiments of the invention, calculating a trust level of end-to-end link 360 should be fast to enable real-time operation. According to embodiments of the invention, this requirement is achieved by embodiments of the invention since calculating hash values and comparing histograms require low computational resources. Dynamic whitelisting according to embodiments of the invention may dynamically reduce the computational power required for performing a comprehensive security analysis.

Returning to FIG. 3, according to embodiments of the invention, agent 322 may send data packets 350 of end-to-end links 360 to security server 330 if a trust level of end-to-end link 360 changes from trusted to not trusted. Additionally or alternatively, agent 322 may issue a security alert if a trust level of end-to-end link 360 changes from trusted to not trusted. Additionally or alternatively, agent 322 may block data packets 350 of end-to-end links 360 if a trust level of end-to-end link 360 changes from trusted to not trusted.

Security server 330 may implement or execute a data security application 332. Data security application 332 may be or may include a firewall, a DAM and/or a FAM, an external database non-intrusive security mechanism (EDSM), enterprise database auditing, and real-time protection. Data security application 332 may provide a database activity monitoring service of data source machine 320, including performing the comprehensive security analysis. Data security application 332 may provide continuous monitoring of database activity of data source machine 320. Examples of data security application 332 may include, but are not limited to, the Guardium® application available from International Business Machines Corporation.

According to embodiments of the invention, data security application 332 may receive or obtain data packet 350. The comprehensive security analysis may include parsing the data packet, mapping metadata to data, building hierarchy of the data (e.g., building a hierarchical-tree of name-value), and processing policy rules. Processing policy rules may require associated names and values. For example, a rule may include "if name like % ID % and value match specific regular expression (Regex)" or a rule may expect a zip code plus street name.

According to some embodiments, data security application 332 may extract a database query or a response to a database query from the intercepted messages 510, parse the extracted database query or response and create a security structure according to database protocol rules. The rules may include, but are not limited to, a type of operation or command identified in a query, a database object to be operated on by the operation, and a user identifier of the user requesting the query, identifiers for a service IP address, a client IP address, a client MAC, a network protocol used to access data, a database type, a service name for the name of a service providing data, a name of a database accessed, a source application used for the data access, an application user name, and operating system user, a database related field, an error code, an exception type, a service IP address of the location of data accessed, and additional or alternate rules.

According to some embodiments, data security application 332 may validate a possible database object access violation in the security structure against security policies defined by the policy rules. In one example, if the security structure does not validate against the security policies, data security application 332 may issue an alert to an administrator or other entity indicating that the intercepted data packet 350 has failed to validate against the security rules. In one example, an administrator or service may set each of the rules. According to some embodiments, the security rules may include one or more settings such as, but not limited to, an operation type setting specifying the type of operation access is or is not allowed for, an object setting specifying one or more particular database objects being acted upon by the operation, and a user setting specifying one or more user identifiers for users requesting the operation on the database object. For example, operations that may be restricted by the security rules may include operations such as, but not limited to, create, select, update and delete. The security settings may include additional or alternate types of settings.

Each of database client 310, security server 330 and data server 420 may be or may include a computing device such as computing device 700 depicted in FIG. 6. One or more databases 326 may be or may include a storage device such as storage device 730.

Figure 7:
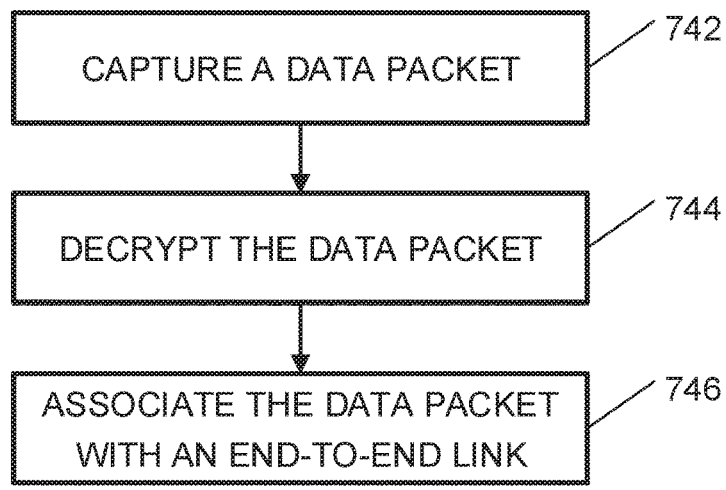
FIG. 7 is a flowchart of a method for associating a message with an end-to-end link, according to embodiments of the invention.

Reference is made to FIG. 7, which is a flowchart of a method for associating a message with an end-to-end link, according to embodiments of the invention. An embodiment of a method for associating a message with an end-to-end link may be performed, for example, by the systems shown in FIGS. 1, 2, 3, 4 and 9. A process of associating a message with an end-to-end link may be repeated for a plurality of data packets flowing between a data source machine and a data client.

In operation 742, a data packet (such as data packet 350) may be captured. The data packet may include a header 352 and a payload 354 including query sent to a database by a data client or a response of the database to a query (e.g., message 510). For example, an agent software instance located at and executed at the data source machine (e.g. the data base server or a proxy or network gate of the database server) may capture the data packet. In operation 744, agent 322 may decrypt the data packet to obtain a header of the data packet and the message. Agent 322 may analyze the header to obtain parameters of the end-to-end link such as ServerHostName, ServiceName, DbName, ClientHost, OsUser, DbUser, etc. In operation 746, agent 322 may analyze the header as disclosed herein to associate the packet with an end-to-end link, for example, based on the parameters extracted from the header.

Figure 8:
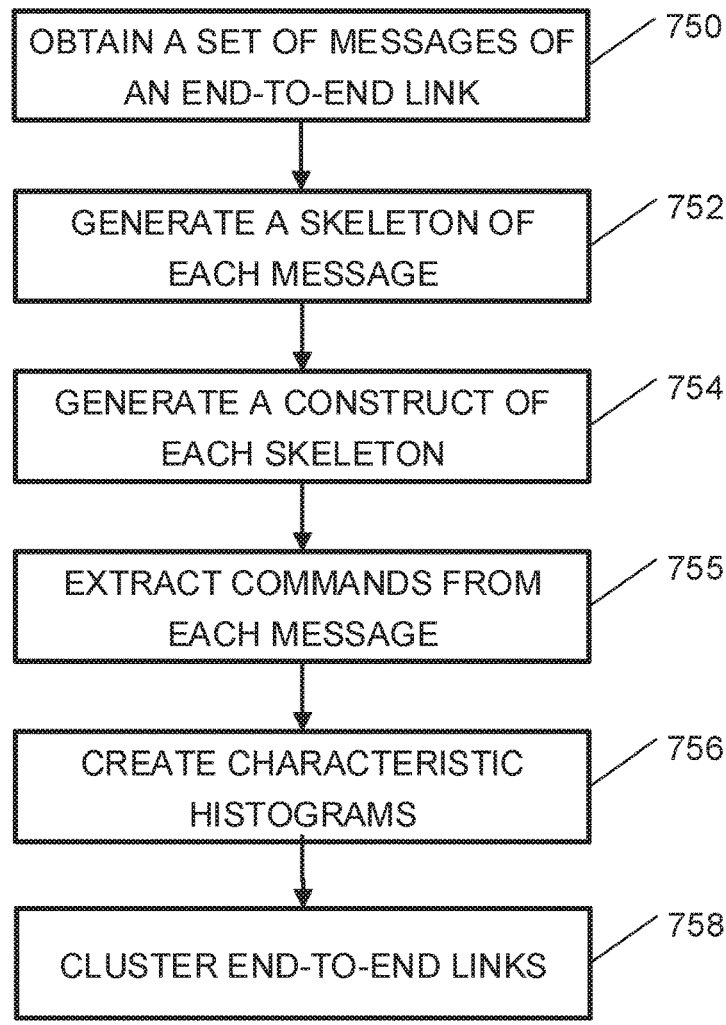
FIG. 8 is a flowchart of a method for generating a characteristic histogram, according to embodiments of the invention

Reference is made to FIG. 8, which is a flowchart of a method for generating a characteristic histogram, according to embodiments of the invention. An embodiment of a method for generating a characteristic histogram may be performed, for example, by the systems shown in FIGS. 1, 2, 3, 4 and 9. An embodiment of a method for generating a characteristic histogram may be performed, for example, in a training stage or preparation stage. According to some embodiments, generating a characteristic histogram may be repeated periodically, e.g., once a week or once a month, to keep the characteristic histogram updated. An embodiment of a method for generating a characteristic histogram may be performed on an end-to-end link 360 with high volume or high rate of messages. For example, above 100 messages per second.

In operation 750, agent 322 may obtain a set of messages of a single end-to-end link. The set of messages may include a predetermined number of messages or messages obtained over a predetermined time window. For example, in a typical application, agent 322 may capture about 150,000-400,000 messages of a single end-to-end link in operation 750. In some embodiments, agent 322 may capture the messages in a plurality of sessions of a single end-to-end link. In some embodiments, agent 322 may capture messages in the first one or two minutes of 20-40 sessions of a single end-to-end link in operation 750. Other time windows for capturing messages for generating the signature may be used. In operation 752, agent 322 may generate a skeleton from each of the messages. The skeleton may include the message text except for the value field. In operation 754, agent 322 may generate a construct, or a compressed form of each skeleton. For example, agent 322 may hash the skeleton to obtain the construct. In operation 755, agent 322 may extract the commands from each of the messages. In operation 756, agent 322 may generate a characteristic histogram for the end to end link. For example, agent 322 may generate the characteristic histogram from the constructs, as disclosed herein. Additionally or alternatively, agent 322 may generate the characteristic histogram from the commands of the messages by dividing the commands to commands groups as disclosed herein. Operations 750-756 may be repeated for a plurality of end-to-end links so that a characteristic histogram may be generated for each of the plurality end-to-end link. In operation 758, agent 322 may cluster or classify end-to-end links to obtain end-to-end links clusters. In some embodiments, the clustering or classification may be performed based on the constructs and commands of the end-to-end links, as disclosed herein. In some embodiments, agent 322 may generate characteristic histograms of a cluster of end-to-end links. In some embodiments, agent 322 may generate characteristic histograms for each of the plurality of end-to-end links in a cluster.

Figure 9:
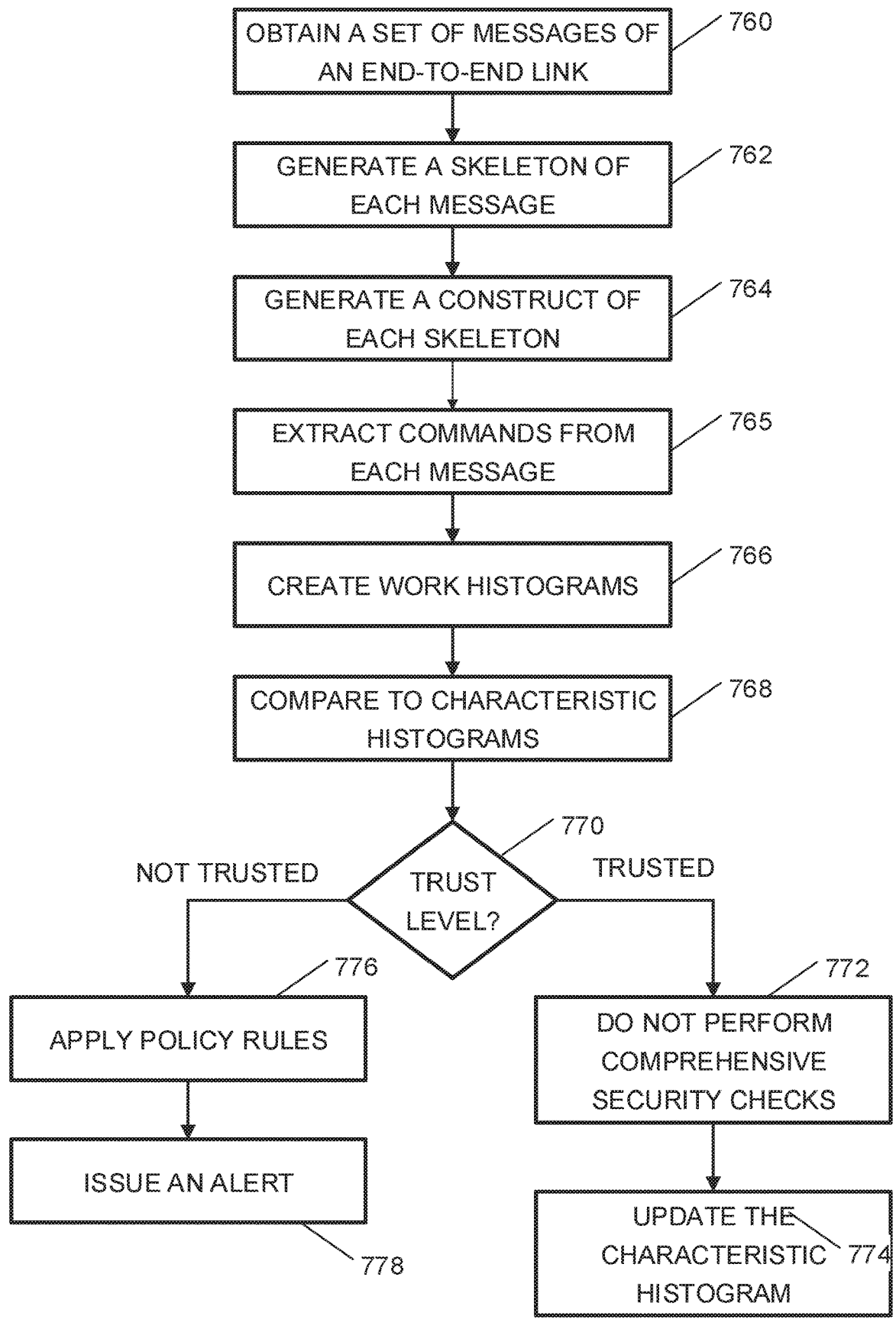
FIG. 9 is a flowchart of a method for dynamically determining a trust level of end-to-end link of a computer database, according to embodiments of the invention.

Reference is made to FIG. 9, which is a flowchart of a method for dynamically, determining a trust level of an end-to-end link of a computer database, according to embodiments of the invention. An embodiment of a method for dynamically determining a trust level of an end-to-end link may be performed, for example, by the systems shown in FIGS. 1, 2, 3, 4 and 9. A process for determining a trust level of an end-to-end link of a computer database may be repeated periodically and/or for every new session. An embodiment of a method for dynamically determining a trust level of an end-to-end link may be performed, for example, for end-to-end links with high volume or high rate of messages. For example, agent 322 may not determine a trust level of an end-to-end link for sessions with messages rate below a threshold, e.g., below 100 messages per second. Instead, messages of sessions with messages rate below a threshold may all undergo a comprehensive security analysis.

In operation 760, agent 322 may obtain a set of messages (also referred to as the second set of messages) of a single end-to-end link. The set of messages may include a predetermined number of messages (e.g., 100-400 messages) or messages obtained over a predetermined time window (one-two minutes). In operation 762, agent 322 may generate a skeleton from each of the messages. The skeleton may include the message text except for the value field. In operation 764, agent 322 may generate a construct, or a compressed form of each skeleton. For example, agent 322 may hash the skeleton to obtain the construct. In operation 765, agent 322 may extract the commands from each of the messages in the second set of messages. In operation 766, agent 322 may generate a work histogram for the end-to-end link. For example, agent 322 may generate a work histogram from the constructs, as disclosed herein. Additionally or alternatively, agent 322 may generate the work histogram from the commands of the messages by dividing the commands into command groups as disclosed herein.

In operation 768, agent 322 may compare the work histograms with the characteristic histograms. In some embodiments, agent 322 may compare the work histograms with the characteristic histograms of the same end-to-end link. In some embodiments, agent 322 may compare the work histograms with the characteristic histograms of a cluster of end-to-end links to which the end-to-end link pertains. In some embodiments, agent 322 may compare the work histograms with each of a plurality of characteristic histograms of a cluster of the end-to-end links to which the end-to-end link pertains.

In operation 770, agent 322 may determine a trust level of the end-to-end link. For example, agent 322 may determine a trust level of the end-to-end link based on the comparison. In some embodiments, agent 322 may compare the variance of the work histograms with the variance of the characteristic histogram and determine that the trust level of the end-to-end link is not trusted if the variance of the work histogram is larger than the characteristic histogram by a predetermined factor, e.g., two. Other rules may apply. Additionally or alternatively, agent 322 may determine the trust level of the end-to-end link as being not trusted if at least one of the constructs of the second set of messages is new. Agent 322 may determine that a construct of the second set of messages is new if the construct is not included in the characteristic histogram. Thus, according to some embodiments, it is enough that the work histogram of an end-to-end link is different from the characteristic histogram of the end to end link, or that at least one of the constructs of the second set of messages is new, for an end-to end link to be considered or categorized as not trusted. The end-to-end link may be considered or categorized as trusted otherwise.

According to some embodiments, if it is determined that the end-to-end link is trusted, agent 322 may not send messages of the end-to-end link to security server 330 for comprehensive security analysis. According to some embodiments, agent 322 may add the constructs used to generate the work histogram to the characteristic histogram to keep the characteristic histogram updated. According to some embodiments, if it is determined in operation 770 that the end-to-end link is not trusted, agent 322 may apply policy rules to future messages of the end-to-end link, and if the end-to-end link is trusted, agent 322 may omit applying policy rules to future messages of the end-to-end link. For example, agent 322 may send messages of the end-to-end link to security server 330 for comprehensive security analysis if the end-to-end link is not trusted. In operation 778, agent 322 may issue a security alert if the end-to-end link is not trusted.

FIG. 10 illustrates an example computing device according to an embodiment of the invention. Various components such as database client 310, security server 330, data source machine 320, database servers 410 and 420, gateway or proxy 422, agent application 322 and other modules, may be or include, or be executed by, computing device 700, or may include components such as shown in FIG. 10. For example, a first computing device 700 with a first processor 705 may be used to classify data in real-time for data streaming, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud"). For example, computing device 700 may be included in cloud computing environment 50 depicted in FIGS. 1 and 2.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for dynamically determining a trust level of an end-to-end link of a computer database, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 730 may include or may store one or more databases including database 326, In some embodiments, some of the components shown in FIG. 10 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may, cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for dynamically determining a trust level of an end-to-end link of a computer database, the method comprising:

in a preparation stage:
capturing a first set of messages of a first end-to-end link;
compressing a skeleton of each message of the first set of messages to generate a construct of each message of the first set of messages, wherein the skeleton comprises the message without a value field;
creating a characteristic histogram of the constructs of the first set of messages;
obtaining a plurality of sets of messages, wherein each set pertains to an end-to-end link of a set of end-to-end links;
generating a construct of each message of the plurality of sets of messages;
creating a characteristic histogram for each end-to-end link of the set of end-to-end links, wherein each characteristic histogram is created from the constructs of a set of messages of an end-to-end link of the set of end-to-end links; and
performing clustering of the characteristic histograms to determine clusters of end-to-end links; and during an operation stage:
capturing a second set of messages of the first end-to-end link;
compressing a skeleton of each message of the second set of messages to generate a construct of each of the second set of messages;
creating a work histogram of the constructs of the second set of messages; and
determining a trust level of the first end-to-end link by comparing the work histogram with the characteristic histogram, and with each of the characteristic histograms of a cluster of the first end-to-end link.

2. The method of claim 1, wherein an end-to-end link is defined according to parameters of the end-to-end link, wherein the parameters are selected from the list consisting of: host name, service name, database name, client host name, operating system user and database user.

3. The method of claim 1, wherein determining the trust level of the end-to-end link comprises determining the trust level of the end-to-end link as not trusted if at least one of the constructs of the second set of messages is not included in the characteristic histogram of the constructs of the first set of messages.

4. The method of claim 1, wherein compressing a skeleton comprises hashing the skeleton.

5. The method of claim 1, comprising:
in the preparation stage:
adding the commands of the first set of messages divided into command groups to the characteristic histogram; and
during the operation stage:
adding the commands of the second set of messages divided into the command groups to the work histogram.

6. The method of claim 1, wherein capturing a second set of messages is repeated for every new session and periodically.

7. The method of claim 1, wherein the trust level is selected from trusted and not trusted, the method comprising:
   not performing comprehensive security analysis for future messages of the end-to-end link if the trust level is trusted; and
   applying policy rules to future messages of the end-to-end link if the trust level is not trusted.

8. The method of claim 1, comprising:
   adding the construct of each of the second set of messages to the characteristic histogram if the trust level is trusted.

9. The method of claim 1, wherein the work histogram is compared with the characteristic histogram by comparing the variance of the work histogram with the variance of the characteristic histogram.

10. A system for dynamically determining a trust level of an end-to-end link, the system comprising:
    a memory; and
    a processor configured to:
      in a preparation stage:
        obtain a first set of messages of a first end-to-end link;
        compress a skeleton of each message of the first set of messages to generate a construct of each message of the first set of messages, wherein the skeleton comprises the message without a value field;
        create a characteristic histogram of the constructs of the first set of messages; obtain a plurality of sets of messages, wherein each set pertains to an end-to-end link of a set of end-to-end links;
        generate a construct of each message of the plurality of sets of messages;
        create a characteristic histogram for each end-to-end link of the set of end-to-end links, wherein each characteristic histogram is created from the constructs of a set of messages of an end-to-end link of the set of end-to-end links; and
        perform clustering of the characteristic histograms to determine clusters of end-to-end links; and
      during an operation stage:
        obtain a second set of messages of the first end-to-end link;
        compress a skeleton of each message of the second set of messages to generate a construct of each of the second set of messages;
        create a work histogram of the constructs of the second set of messages; and
        determine a trust level of the first end-to-end link by comparing the work histogram with the characteristic histogram and with each of the characteristic histograms of a cluster of the first end-to-end link.

11. The system of claim 10, wherein the processor is configured to define an end-to-end link according to parameters of the end-to-end link, wherein the parameters are selected from the list consisting of: host name, service name, database name, client host name, operating system user and database user.

12. The system of claim 10, wherein the processor is configured to determine the trust level of the end-to-end link by determining the trust level of the end-to-end link to be not trusted if at least one of the constructs of the second set of messages is not included in the characteristic histogram of the constructs of the first set of messages.

13. The system of claim 10, wherein the processor is configured to compress a skeleton by hashing the skeleton.

14. The system of claim 10, wherein the processor is configured to:
    in the preparation stage:
      add the commands of the first set of messages divided into command groups to the characteristic histogram; and
    during the operation stage:
      add the commands of the second set of messages divided into the command groups to the work histogram.

15. The system of claim 10, wherein the processor is configured to repeat capturing a second set of messages every new session and periodically.

16. The system of claim 10, wherein the trust level is selected from trusted and not trusted, wherein the processor is configured to:
    not perform comprehensive security analysis for future messages of the end-to-end link if the trust level is trusted; and
    apply policy rules to future messages of the end-to-end link if the trust level is not trusted.

17. The system of claim 10, wherein the processor is configured to:
    add the construct of each of the second set of messages to the characteristic histogram if the trust level is trusted.

18. The system of claim 10, wherein the processor is configured to compare the work histogram with the characteristic histogram by comparing the variance of the work histogram with the variance of the characteristic histogram.

* * * * *